US008417522B2

(12) United States Patent
Xu et al.

(10) Patent No.: US 8,417,522 B2
(45) Date of Patent: *Apr. 9, 2013

(54) SPEECH RECOGNITION METHOD

(75) Inventors: Haitian Xu, Cambridgeshire (GB); Kean Kheong Chin, Cambridgeshire (GB)

(73) Assignee: Kabushiki Kaisha Toshiba, Tokyo (JP)

(*) Notice: Subject to any disclaimer, the term of this patent is extended or adjusted under 35 U.S.C. 154(b) by 118 days.

This patent is subject to a terminal disclaimer.

(21) Appl. No.: 12/763,438

(22) Filed: Apr. 20, 2010

(65) Prior Publication Data

US 2010/0204988 A1     Aug. 12, 2010

Related U.S. Application Data

(63) Continuation of application No. PCT/JP2009/067135, filed on Sep. 24, 2009.

(30) Foreign Application Priority Data

Sep. 29, 2008  (GB) .................................. 0817824.6

(51) Int. Cl.
*G10L 15/20* (2006.01)
(52) U.S. Cl. ........................................ 704/233
(58) Field of Classification Search .................. None
See application file for complete search history.

(56) References Cited

U.S. PATENT DOCUMENTS

| | | | | |
|---|---|---|---|---|
| 6,026,359 A * | 2/2000 | Yamaguchi et al. | ....... | 704/256.4 |
| 6,865,531 B1 * | 3/2005 | Huang | .......................... | 704/226 |
| 7,165,026 B2 * | 1/2007 | Acero et al. | .................. | 704/226 |
| 2002/0052741 A1 * | 5/2002 | Seo et al. | ....................... | 704/233 |
| 2004/0052383 A1 | 3/2004 | Acero et al. | | |
| 2004/0181410 A1 * | 9/2004 | Hwang | .......................... | 704/256 |
| 2004/0230420 A1 * | 11/2004 | Kadambe et al. | ............. | 704/205 |
| 2006/0149558 A1 * | 7/2006 | Kahn et al. | ..................... | 704/278 |
| 2010/0070277 A1 * | 3/2010 | Arakawa et al. | ............. | 704/246 |

FOREIGN PATENT DOCUMENTS

| | | |
|---|---|---|
| JP | 11-095786 | 4/1999 |
| JP | 2004-102287 | 4/2004 |
| JP | 2004-264816 | 9/2004 |
| JP | 2005-062890 | 3/2005 |
| JP | 2006-84732 | 3/2006 |

OTHER PUBLICATIONS

Alex Acero, et al., "HMM Adaptation Using Vector Taylor Series For Noisy Speech Recognition", ISCA Archive, 6th International Conference on Spoken Language Processing (ICSLP 2000), vol. 3, Oct. 16-20, 2000, pp. 869-872.

(Continued)

*Primary Examiner* — Leonard Saint Cyr
(74) *Attorney, Agent, or Firm* — Oblon, Spivak, McClelland, Maier & Neustadt, L.L.P.

(57) ABSTRACT

A speech recognition method includes receiving a speech input signal in a first noise environment which includes a sequence of observations, determining the likelihood of a sequence of words arising from the sequence of observations using an acoustic model, adapting the model trained in a second noise environment to that of the first environment, wherein adapting the model trained in the second environment to that of the first environment includes using second order or higher order Taylor expansion coefficients derived for a group of probability distributions and the same expansion coefficient is used for the whole group.

17 Claims, 4 Drawing Sheets

OTHER PUBLICATIONS

H. Liao, et al., "Joint Uncertainty Decoding for Noise Robust Speech Recognition", Interspeech 2005, pp. 3129-3132.

Jinyu Li et al., "High-Performance HMM Adaptation With Joint Compensation of Additive and Convolutive Distortions Via Vector Taylor Series", Automatic Speech Recognition & Understanding, 2007; ASRU; IEEE Workshop on, Dec. 9, 2007, pp. 65-70.

H. Liao et al., "Adaptive Training With Joint Uncertainty Decoding for Robust Recognition of Noisy Data", Acoustics, Speech and Signal Processing, 2007; ICASSP 2007; IEEE International Conference on, vol. 4, Apr. 20, 2007; pp. IV-389-IV-392.

Office Action (with English translation) mailed on Sep. 11, 2012, in counterpart Japanese Appln No. 2011-513765 (10 pages).

* cited by examiner

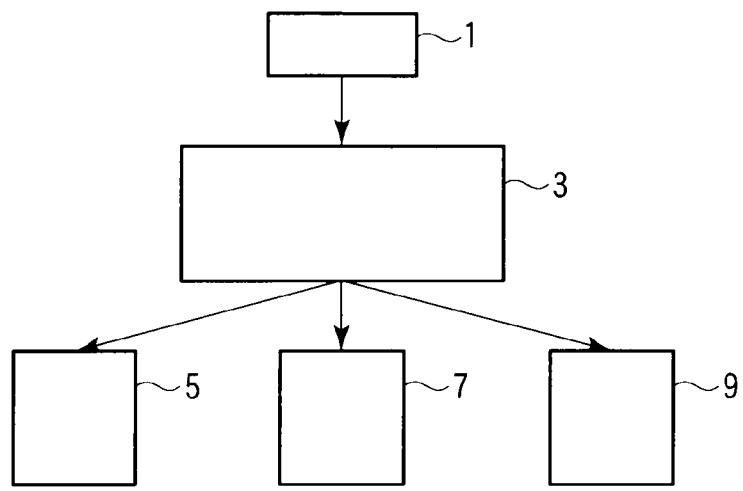
F I G. 1
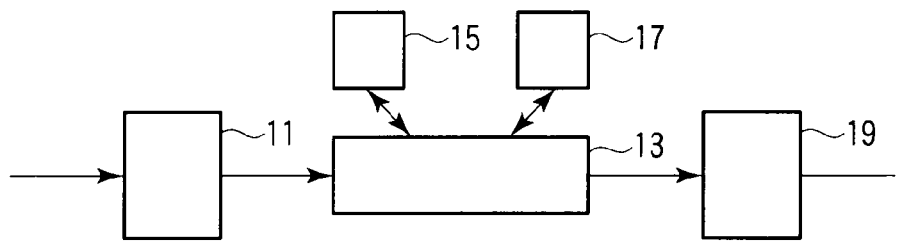
F I G. 2
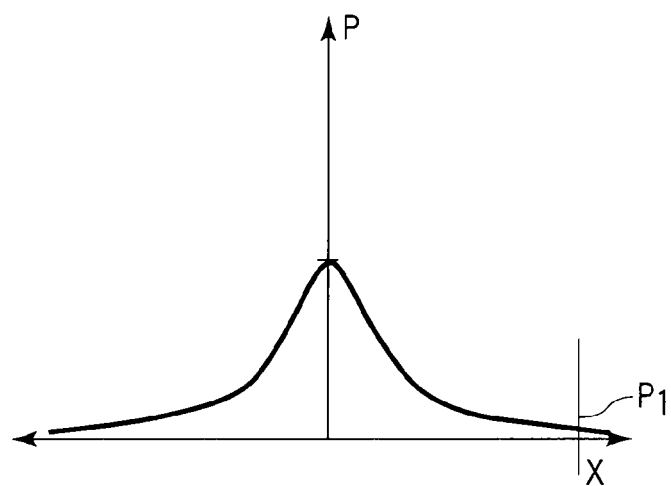
F I G. 3

SPEECH RECOGNITION METHOD

CROSS REFERENCE TO RELATED APPLICATIONS

This is a Continuation Application of PCT Application No. PCT/JP2009/067135, filed Sep. 24, 2009, which was published under PCT Article 21(2) in English.

This application is based upon and claims the benefit of priority from prior British Patent Application No. 0817824.6, filed Sep. 29, 2008, the entire contents of which are incorporated herein by reference.

BACKGROUND OF THE INVENTION

1. Field of the Invention

The present invention can be concerned with the technical field of pattern recognition and specifically speech recognition. More particularly, the present invention can be concerned with speech recognition in noisy environments.

2. Description of the Related Art

Speech recognition is a technique which relies on the use of trained models such as Hidden Markov Models (HMMs) to decode an audio speech signal into recognisable words which can either be displayed or further processed. Further processing may include outputting the text into a language translation device or converting it into an understandable instruction for use voice controlled apparatus.

Generally, the models are trained in a noise-free environment. However, in use, the systems are generally used in relatively noisy environments compared to the laboratory training environment.

Two successful techniques have been developed for speech recognition in noisy environments. The first of these is the vector Taylor series (VTS) method. The VTS method is described in Acero et al: "HMM adaptation using vector Taylor series for noisy speech recognition", In ICSLP-2000, vol. 3, 869-872. The VTS method compensates the HMM on each Gaussian mixture level. The system uses the mean value of each mixture as the Taylor extension points and calculates the Taylor extension matrices for each mixture. The likelihood during recognition is then expressed as:

$$p(y|m) = N(y; \mu_y^m; \Sigma_y^m) \quad (a)$$

where p(y|m) is the likelihood of the Gaussian mixture m from the noisy speech feature y, $\mu_y$ and $\Sigma_y$ are the Gaussian mixture mean and variance.

In the VTS, it is assumed that the relationship between noisy and clean features is as follows:

$$y = x + h + g(x, n, h) = x + h + C \ln(1 + e^{C^{-1}(n-x-h)}) \quad (b)$$

where y is the noisy speech feature, x the corresponding clean speech feature, C the discrete cosine transform matrix and n and h the static features for additive and convolutional noise respectively.

Given a Taylor extension point $(x_e, n_e, h_e)$, the above non-linear relation can be linearly approximated by the first-order Taylor series as:

$$y \approx x_e + h_e + g(x_e, n_e, h_e) + W(x - x_e) + (I - W)g(x_e, n_e, h_e)(n - n_e) + W(h - h_e)$$

$$W = I + \nabla_x g(x_e, n_e, h_e) \quad (c)$$

By using the above relations, it is possible to relate the mean and variance of a Gaussian for clean speech to the mean and variance of a Gaussian for noisy speech. This can be done for the static, delta and delta-delta parts of the received signal.

By applying these conversions, it is possible to adapt the trained clean model for the noisy environment.

The above method suffers from the problem in that it is computationally very laborious since conversion parameters need to be calculated for each Gaussian in the HMM. Generally, in this procedure, only the first order Taylor series expansion is used.

An alternative method is the so-called joint uncertainty decoding (JUD) method, which is described in Liao, H./Gales, M. J. F. (2005): "Joint uncertainty decoding for noise robust speech recognition", In INTERSPEECH-2005, 3129-3132. The JUD method calculates the output probability for the mixture m as follows:

$$p(Y|m) = |A_r|N(A_r Y + b_r; \Lambda_x^m, \Xi_x^m + \Xi_b^r) \quad (d)$$

It is assumed that mixture m belongs to the $r^{th}$ regression class the method is performed in a class-by-class basis. This means that the JUD transforms relate to the same regression class are defined as:

$$A_r = \Xi_x^r (\Xi_{yx}^r)^{-1}, \; b_r = \Lambda_x^r - A_r \Lambda_y^r$$

$$\Xi_b^r = A_r \Xi_y^r A_r^T - \Xi_x^r \quad (e)$$

Where $\Lambda_x^r$, $\Xi_x^r$, $\Lambda_y^r$, and $\Xi_y^r$ are respectively the mean and covariance for clean and noisy speech in regression class r, and $\Xi_{yx}^r$ is the cross covariance matrix. The calculation of $\Xi_{yx}^r$ is costly from a computational point of view and is often approximated by a first order Taylor expansion.

After manipulating the results, it can be seen that the JUD is essentially equivalent to the VTS method since they both involve the calculation of a first order Taylor series. However, in the VTS, the first order calculation is performed for each Gaussian whereas in the JUD, it is performed for each regression class. This means that the JUD method is computationally advantageous over the VTS method. However, the JUD method has considerably lower accuracy than VTS.

BRIEF SUMMARY OF THE INVENTION

The present inventors have attempted to address the above problem and derive a speech recognition method which is computationally on a par with a JUD method but also achieves better accuracy than the VTS method.

Thus, in a first aspect, the present invention may provide a speech recognition method, comprising:
  receiving a speech input in a first noise environment which comprises a sequence of observations;
  determining the likelihood of a sequence of words arising from the sequence of observations using an acoustic model, comprising:
    providing an acoustic model for performing speech recognition on a input signal which comprises a sequence of observations, wherein the model has been trained to recognise speech in a second noise environment, the model having a plurality of model parameters relating to the probability distribution of a word or part thereof being related to an observation; and
    adapting the model trained in the second environment to that of the first environment,
  the speech recognition method further comprising determining the likelihood of a sequence of observations occurring in a given language using a language model;
  combining the likelihoods determined by the acoustic model and the language model and outputting a sequence of words identified from the speech input signal, wherein adapting the model trained in the second environment to that of the first environment comprises using second order or higher order Taylor expansion coefficients derived for a group of probability distributions and wherein the same expansion coefficient is used for the whole group.

The model may be adapted by converting the parameters obtained for the second noise environment into parameters for the first noise environment. For example, the means and the variance of the pdf determined for the second noise environment may be directly modified to means and variances of pdfs in the first noise environment. The model may also be adapted in a way which has the effect of modifying these parameters, but which does not directly translate these parameters. For example, the JUD style adaptation of equation (d) above may be used.

In a preferred embodiment, the groups are further combined to form aggregated groups and $j^{th}$ order Taylor coefficients are calculated and used for the groups and $j+1^{th}$ order coefficients are calculated and used for the aggregated groups, where j is an integer of at least one.

The groups are preferably regression classes which are formed during the training of the model in the second noise environment. These classes will usually be formed before the model is used for speech recorded in the first environment.

In a further preferred embodiment, the groups are regression classes formed by sequentially subdividing the total number of probability distributions by two, to form 2 classes, then 4 classes, then 8 classes etc to form a regression tree. In such an arrangement, the number of regression classes may be in the range from 4 to 32, for example preferable 8 to 32.

The first order Taylor coefficients may be calculated for classes on one level on the regression tree, whereas the second order may be calculated for a different level with fewer regression classes. It has been found that calculating the second order coefficients for the regression tree level with just two classes provides significant improvement.

Although it is possible to perform speech recognition using just the static parts of speech preferably the delta and delta-delta mean and or variance are also used. However, it is not necessary to use the same order of Taylor expansion on each of the static, delta and delta-delta parts. In a preferred embodiment, the second order is calculated for the static and delta parts, but not for the delta-delta parts. It is also possible just to calculate the second order for the static parts alone.

The noise parameters may comprises a component for additive noise and a component for convolutional noise.

The relationship between a feature or observation in the first noise environment and a feature or observation in the second noise environment maybe related by:

$$y=x+h+g(x, n, h)=x+h+C\ln(1+e^{C^{-1}(n-x-h)}) \quad (1)$$

where y is the observation in the first noise environment, x is the observation in the second noise environment, n is the additive noise, h is the convolutional noise in the first environment with respect to the second environment and C is the discrete cosine transformation matrix. Although, other models may also be used.

In the preferred embodiment, the means of the noise parameters are estimated and used to determine the Taylor expansion coefficients. The process of estimating the means may involve performing an initial estimate from parts of the speech input signal where speech is not present. The initial estimate may be further refined by using a well known method such as an expectation-maximisation method in which it is based on the whole utterance, i.e. not only the silence part.

Generally, the probability functions are Gaussians and the acoustic model is a hidden Markov Model.

In many situations the first environment is a noisy environment and the second environment is a noise free environment. However, it will be appreciated by those skilled in the art that the present invention can be used to adapt a model between any two environments with different noise levels.

The method may be embodied in a system such that the system always applies the method without performing any test for noisiness of the environment. Alternatively, a noise test may be performed first to see if the noise conditions warrant the use of compensating the model as described above.

The invention may be used as part of a speech translation system where the output of the above method is translated into a different language; and outputted the recognised speech in the different language. The outputting may comprise using a text to speech conversion method.

In a second aspect, the present invention may provide a speech recognition apparatus, the apparatus comprising:
  a receiver for a speech input, the speech input comprising a sequence of observations,
  a processor adapted to determine the likelihood of a sequence of words arising from the sequence of observations using an acoustic model, the processor being adapted to:
    provide an acoustic model for performing speech recognition on the input signal, wherein the model has been trained to recognise speech in a second noise environment which is different to the first noise environment of the speech input, the model having a plurality of model parameters relating to the probability distribution of a word or part thereof being related to an observation;
    adapting the model trained in the second environment to that of the first environment;
  the processor being further adapted to determine the likelihood of a sequence of observations occurring in a given language using a language model; and
  combine the likelihoods determined by the acoustic model and the language model,
  the apparatus further comprising an output adapted for outputting a sequence of words identified from the speech input signal,
  wherein adapting the model trained in the second environment to that of the first environment comprises using second order or higher order Taylor expansion coefficients derived for a group of probability distributions and wherein the same expansion coefficient is used for the whole group.

The above can be thought of as a method for adapting a speech recognition model between first and second noise environments, thus, in a third aspect, the method comprises:
  providing a model for performing speech recognition on a input signal which comprises a sequence of observations, wherein the model has been trained to recognise speech in a second noise environment, the model having a plurality of model parameters relating to the probability distribution of a word or part thereof being related to an observation; and
  adapting the model trained in the second environment to that of the first environment;
  wherein adapting the model trained in the second environment to that of the first environment comprises using second order or higher order Taylor expansion coefficients derived for a group of probability distributions and wherein the same expansion coefficient is used for the whole group.

Although the above description has concentrated on speech recognition, the method could also be applied to other forms of pattern recognition.

Therefore, in a fourth aspect, the present invention may provide a method of adapting a pattern recognition model between first and second noise environments, the method comprising:

providing a model for performing pattern recognition on a input signal which comprises a sequence of observations, wherein the model has been trained to recognise a pattern in the second noise environment, the model having a plurality of model parameters relating to the probability distribution of a component of a pattern being related to an observation; and adapting the model trained in the second environment to that of the first environment, wherein adapting the model trained in the second environment to that of the first environment comprises using second order or higher order Taylor expansion coefficients derived for a group of probability distributions and wherein the same expansion coefficient is used for the whole group.

In a fifth aspect, the present invention may provide a computer running a computer program configured to cause a computer to perform any of the above methods.

BRIEF DESCRIPTION OF THE SEVERAL VIEWS OF THE DRAWING

FIG. 1 is a schematic of a general speech recognition system;

FIG. 2 is a schematic of the components of a speech recognition processor;

FIG. 3 is a schematic of a Gaussian probability function;

DETAILED DESCRIPTION OF THE INVENTION

Figure 4:
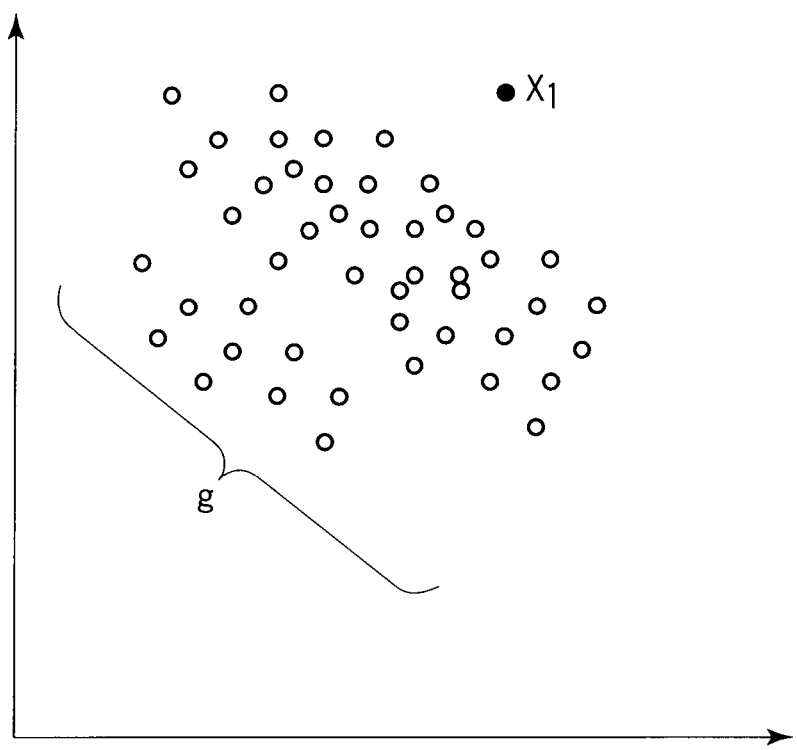
FIG. 4 is a schematic plot of acoustic space representing both probability density functions and an observation vector.

FIG. 1 is a schematic of a very basic speech recognition system. A user (not shown) speaks into microphone 1 or other collection device for an audio system. The device 1 could be substituted by a memory which contains audio data previously recorded or the device 1 may be a network connection for receiving audio data from a remote location.

The speech signal is then directed into a speech processor 3 which will be described in more detail with reference to FIG. 2.

The speech processor 3 takes the speech signal and turns it into text corresponding to the speech signal. Many different forms of output are available. For example, the output may be in the form of a display 5 which outputs to a screen. Alternatively, the output could be directed to a printer or the like. Also, the output could be in the form of an electronic signal which is provided to a further system 9. For example, the further system 9 could be part of a speech translation system which takes the outputted text from processor 3 and then converts it into a different language. The converted text is then outputted via a further text or speech system.

Alternatively, the text outputted by the processor 3 could be used to operate different types of equipment, for example, it could be part of a mobile phone, car, etc. where the user controls various functions via speech.

FIG. 2 is a block diagram of the standard components of a speech recognition processor 3 of the type shown in FIG. 1. The speech signal received from microphone, through a network or from a recording medium 1 is directed into front-end unit 11.

The front end unit 11 digitises the received speech signal and splits it into frames of equal lengths. The speech signals are then subjected to a spectral analysis to determine various parameters which are plotted in an "acoustic space". The parameters which are derived will be discussed in more detail later.

The front end unit 11 also removes signals which are believed not to be speech signals and other irrelevant information. Popular front end units comprise apparatus which use filter bank (F BANK) parameters, MelFrequency Cepstral Coefficients (MFCC) and Perceptual Linear Predictive (PLP) parameters. The output of the front end unit is in the form of an input vector which is in n-dimensional acoustic space.

The input vector is then fed into a decoder 13 which cooperates with both an acoustic model section 15 and a language model section 17. The acoustic model section 15 will generally operate using Hidden Markov Models. However, it is also possible to use acoustic models based on connectionist models and hybrid models.

The acoustic model unit 15 derives the likelihood of a sequence of observations corresponding to a word or part thereof on the basis of the acoustic input alone.

The language model section 17 contains information concerning probabilities of a certain sequence of words or parts of words following each other in a given language. Generally a static model is used. The most popular method is the N-gram model.

The decoder 13 then traditionally uses a dynamic programming (DP) approach to find the best transcription for a given speech utterance using the results from the acoustic model 15 and the language model 17.

This is then output via the output device 19 which allows the text to be displayed, presented or converted for further use e.g. in speech to speech translation or to control a voice activated device.

This description will be mainly concerned with the use of an acoustic model which is a Hidden Markov Model (HMM). However, it could also be used for other models.

The actual model used in this embodiment is a standard model, the details of which are outside the scope of this patent application. However, the model will require the provision of probability density functions (pdfs) which relate to the probability of an observation represented by an acoustic vector being related to a word or part thereof. Generally, this probability distribution will be a Gaussian distribution in n-dimensional space.

A schematic example of a generic Gaussian distribution is shown in FIG. 3. Here, the horizontal axis corresponds to a parameter of the input vector in one dimension and the probability distribution is for a particular word or part thereof relating to the observation. For example, in FIG. 3, an observation corresponding to an acoustic vector x has a probability p1 of corresponding to the word whose probability distribution is shown in FIG. 3. The shape and position of the Gaussian is defined by its mean and variance. These parameters are determined during training for the vocabulary which the acoustic model, they will be referred to as the "model parameters".

In a HMM, once the model parameters have been determined, the model can be used to determine the likelihood of a sequence of observations corresponding to a sequence of words or parts of words.

FIG. 4 is schematic plot of acoustic space where an observation is represented by an observation vector or feature vector $x_1$. The open circles g correspond to the means of Gaussians or other probability distribution functions plotted in acoustic space.

During decoding, the acoustic model will calculate a number of different likelihoods that the feature vector $x_1$ corresponds to a word or part thereof represented by the Gaussians. These likelihoods are then used in the acoustic model and combined with probabilities from the language model to determine the text spoken.

The acoustic model is generally trained under noise-free or so-called "clean" conditions. However, the error rate of the system will increase if the speech inputted into the system is then collected under noisier conditions. The front-end unit 11 described with reference to FIG. 2 can remove some of the noise. However, some of it is so engrained into the inputted speech signal that it is impossible to remove at this early stage.

Figure 5:
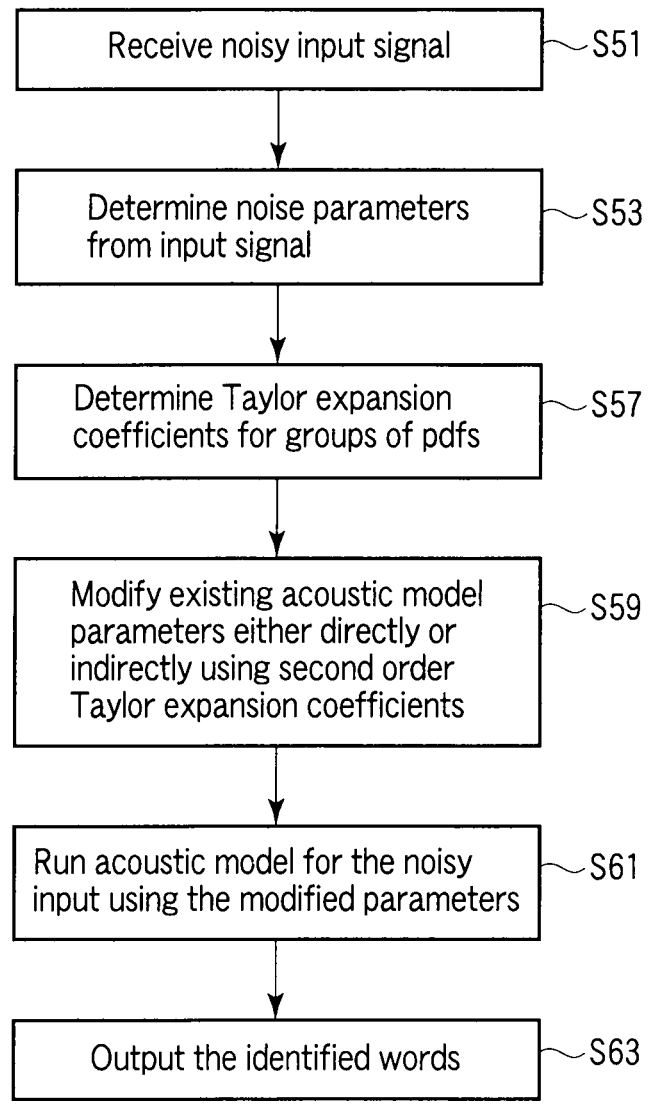
FIG. 5 is a flow diagram showing a speech recognition method in accordance with an embodiment of the present invention.

FIG. 5 is a flow diagram of a method in accordance with an embodiment of the present invention for coping with a noisy input signal when using an acoustic model which has been trained under clean conditions. First, the noisy input signal is collected in S51. This has been explained with reference to FIGS. 1 and 2.

An indication of the noise in this signal is then determined in step S53. A possible method of estimating the noise is to evaluate a part of the input signal where there is no speech. Often the first and last few frames are assumed to have no speech.

In a preferred method, noise is categorised as either additive noise n or convolutional noise h. Additive noise n is the general background noise whereas convolutional noise h is the channel noise.

A model for relating features in a noisy environment to those of a clean environment is expressed as:

$$y = x + h + g(x, n, h) = x + h + C \ln(1 + e^{C^{-1}(n-x-h)}) \quad (1)$$

Here C denotes the discrete cosine transformation matrix, n, h, x and y are static features for additive noise, convolutional noise, clean speech and noisy speech respectively.

Thus, it is possible to compensate for a noisy environment once the noise parameters have been established. The noise varies from frame to frame during the collection of the speech signal. However, from the frames noted above, it is possible to estimate the mean of the additive noise, the variance of the additive noise, the mean of the convolutional noise and the variance of the convolutional noise. Generally, it is assumed that the convolutional noise is constant over each utterance and therefore its variance is assumed to be 0.

It is also possible to estimate the delta and delta-delta terms of the mean and variance of the noise. The delta term is the first derivative with respect to time of the mean or variance and the delta-delta term is the second derivative with respect to time of the mean or variance.

In this embodiment, regression classes are used to form the groups. Regression classes are generated with Gaussians which model certain characteristics being grouped together. They are developed during initial training of the model in the second or clean noise environment and so are available for use. This regression process is well-known and will not be described in more detail here.

Figure 6:
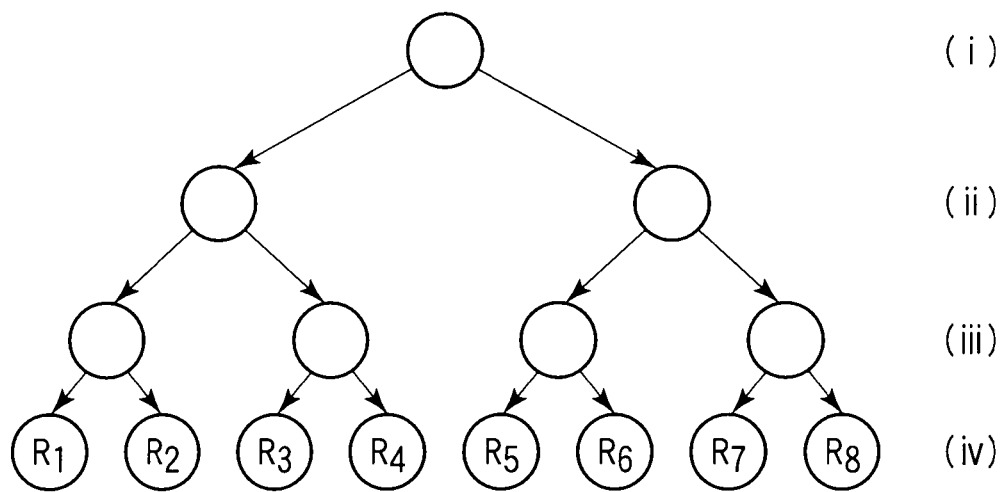
FIG. 6 is a schematic of a regression tree.

FIG. 6 shows a schematic of a regression tree which is used to form the regression classes. At level (i) all of the Gaussians from one group. This group is then divided into two classes at level (ii). These two classes are then sub-divided again into four classes at level (iii), then into eight classes at level (iv) etc.

In step S57, the Taylor expansion coefficients for each class are determined.

The use of Taylor expansion coefficients for coping with a noisy environment is known. In the known VTS method, equation 1 above is approximated using a Taylor extension point $(x_e, n_e, h_e)$ to give the following equation:

$$y \approx x_e + h_e + g(x_e, n_e, h_e) + W(x - x_e) + (I - W)g(x_e, n_e, h_e)(n - n_e) + W(h - h_e)$$

$$W = I + \nabla_x g(x_e, n_e, h_e) \quad (2)$$

Where I is the identity matrix.

Using the above, the mean and variances of the Gaussians for a noisy environment and a clean environment can be related. In this prior art method, Taylor expansion coefficients are calculated for each Gaussian.

The known JUD method also uses a Taylor expansion. In the JUD method, the likelihood calculation for each Gaussian mixture of the full noisy feature Y which includes static, delta and delta-delta parts is:

$$p(Y|m) = |A_r| N(A_r Y + b_r; \Lambda_x^m, \Xi_x^m + \Xi_b^r) \quad (3)$$

where assuming that mixture m relates to the rth regression class, $A_r$, $b_r$ and $\Xi_b^r$ are JUD transforms related to the regression class:

$$A_r = \Xi_x^r (\Xi_{yx}^r)^{-1}, \quad b_r = \Lambda_x^r - A_r \Lambda_y^r$$

$$\Xi_b^r = A_r \Xi_y^r A_r^T - \Xi_x^r$$

where $\Lambda_x^r$, $\Xi_x^r$, $\Lambda_y^r$, and $\Xi_y^r$ are respectively the mean and covariance for clean and noisy speech in regression class r, and $\Xi_{yx}^r$ is the cross covariance matrix. The calculation of $\Xi_{yx}^r$ is costly from a computational point of view and is often approximated by a first order Taylor expansion. $A_r$ then becomes:

$$A_r = \begin{pmatrix} W_r^{-1} & 0 & 0 \\ 0 & W_r^{-1} & 0 \\ 0 & 0 & W_r^{-1} \end{pmatrix} \quad (4)$$

Using this method, it is possible to relate the means and variances of the Gaussians in a noisy environment directly to those in a clean environment as for VTS above.

The JUD then becomes largely equivalent to the VTS method except that instead of using the mean of each mixture, the JUD applies the expansion over the mean of the regression class.

The method in accordance with the embodiment can be thought of as a JUD method using a second or higher order Taylor expansion.

Using a second order approximation and using the extension point $(\mu_x^r, \mu_n, \mu_h)$ the second order Taylor on this feature vector is $$y = \mu_x^r + \mu_h + g(\mu_x^r, \mu_n, \mu_h) + W_r(x - \mu_x^r) + \tag{5}$$

$$\frac{1}{2}K_r \text{diag}\{(x-\mu_x^r)(x-\mu_x^r)^T + (n-\mu_n)(n-\mu_n)^T -$$

$$(x-\mu_x^r)(n-\mu_n)^T - (n-\mu_n^r)(x-\mu_x)^T\}($$

where diag{.} outputs the diagonal of the given matrix as a vector, and diag$^{-1}${.} expands a vector into a diagonal matrix. The second order derivative Kr is calculated as $$K_r = \nabla_{xx} g(\mu_x^r, \mu_n, \mu_h) \tag{6}$$

$$= C \text{diag}^{-1} \left\{ \frac{e^{C^{-1}(\mu_n - \mu_x^r - \mu_h)}}{[1 + e^{C^{-1}(\mu_n - \mu_x^r - \mu_h)}]^2} \right\} C^{-1} C^{-1}$$

Taking the mean value on both sides of the above equations, the new JUD formulae for HMM mean adaptation are obtained as:

$$\mu_y^m = \mu_x^r + \mu_h + g(\mu_x^r, \mu_n, \mu_h) + W_r(\mu_x^m - \mu_x^r) + K_r d^m$$

$$\Delta\mu_y^m = W_r \Delta\mu_x^m + K_r d_\Delta^m$$

$$\Delta\Delta\mu_y^m = W_r \Delta\Delta\mu_x^m + K_r d_{\Delta\Delta}^m$$

In the formula above, $d^m$, $d^m_\Delta$, $d^m_{\Delta\Delta}$ are vectors dependent on each mixture.

$$d^m = \frac{1}{2} \text{diag}\{\Sigma_x^m + \Sigma_n + (\mu_x^m - \mu_x^r)(\mu_x^m - \mu_x^r)^T]\}$$

$$d_\Delta^m = \text{diag}\{(\mu_x^m - \mu_x^r)\Delta\mu_x^{mT}\}$$

$$d_{\Delta\Delta}^m = \text{diag}\{(\mu_x^m - \mu_x^r)\Delta\Delta\mu_x^{mT} + \Delta\Sigma_x^m + \Delta\Sigma_n + \Delta\mu_x^m\Delta\mu_x^{mT}\}$$

This means that the likelihood calculation can be rewritten as:

$$p(Y|m) = |A_r| N(A_r Y + b_r; \Lambda_x^m + \Lambda_b^m, \Xi_x^m + \Xi_b^r)$$

where:

$$\Lambda_b^m = \begin{pmatrix} W_r^{-1} K_r d^m \\ W_r^{-1} K_r d_\Delta^m \\ W_r^{-1} K_r d_{\Delta\Delta}^m \end{pmatrix}$$

is the only difference between the above equation and equation (3).

The above is a JUD with a second order approximation. This has considerable advantages over the original JUD form and the well-known VTS arrangements.

The above form is able to beat the commonly used first order VTS on recognition accuracy which is almost impossible for the original JUD. Second, although the new JUD formula does introduce extra computational costs and the calculations compared to the original JUD with the first order approximation, its overall cost is still expectedly far less than VTS because the computation of Wr and Kr are only performed for each regression class. Therefore, it is expected the JUD with second order approximation could beat VTS on computational costs and on the regression accuracy.

Once the parameters have been determined, they are used to modify the existing acoustic model parameters as set out in step S59.

The acoustic model is then run for noisy input using the modified parameters in step 61. The identified words are then output in step 63.

In the method in accordance with the first embodiment, the first and second order Taylor coefficients are calculated for each regression class in the regression class level chosen. For example, if level (iv) is chosen, then the first and second order Taylor coefficients are calculated for each of the 8 regression classes on that level.

In the second embodiment, the first order Taylor coefficient is calculated for each of the regression classes to which the Gaussians have been assigned. However, the second order Taylor coefficients are only calculated for the higher groups. For example, in FIG. 6 there are 8 regression classes on level (iv) $R_1$ to $R_8$. The first order Taylor expansion coefficient will be calculated from the means from each of the regression classes $R_1$ to $R_8$. However, the second order Taylor coefficients will only be calculated for the 4 classes of level (iii). Thus, the same second order Taylor coefficients are used for classes $R_1$ and $R_2$ and the same second order Taylor coefficients are used for groups $R_3$ and $R_4$.

The above approximation enhances the speed of operation since the g vector and the $W_r$ and $K_r$ matrices are costly in the second order approximation. Therefore, by reducing the overall number of these matrices and vectors which need to be calculated, the efficiency may be improved. Based on the theory of Taylor expansion, the lower order terms in the Taylor series are more important than the higher order ones. Specifically, the zeroth order term g is most important for the Taylor expansion, the first order term $W_r$ is less important whereas the second order term $K_r$ is of least importance.

Therefore only calculating to $K_r$ for a larger group which will be applied to more than one group will not result in a significant change in accuracy.

Thus, the method can be adapted to that different levels of regression classes are used for different orders of Taylor expansion coefficients with lower order coefficients being calculated for more regression classes and higher order coefficients being calculated for fewer classes.

It has also been noted that applying a second order approximation for JUD in the delta-delta feature part provides little improvement to accuracy compared to the static and delta parts. Considering the computational costs, it is preferred to only calculate the second order JUD for the static and delta parts and use just the first order JUD for the delta-delta part.

Figure 7:
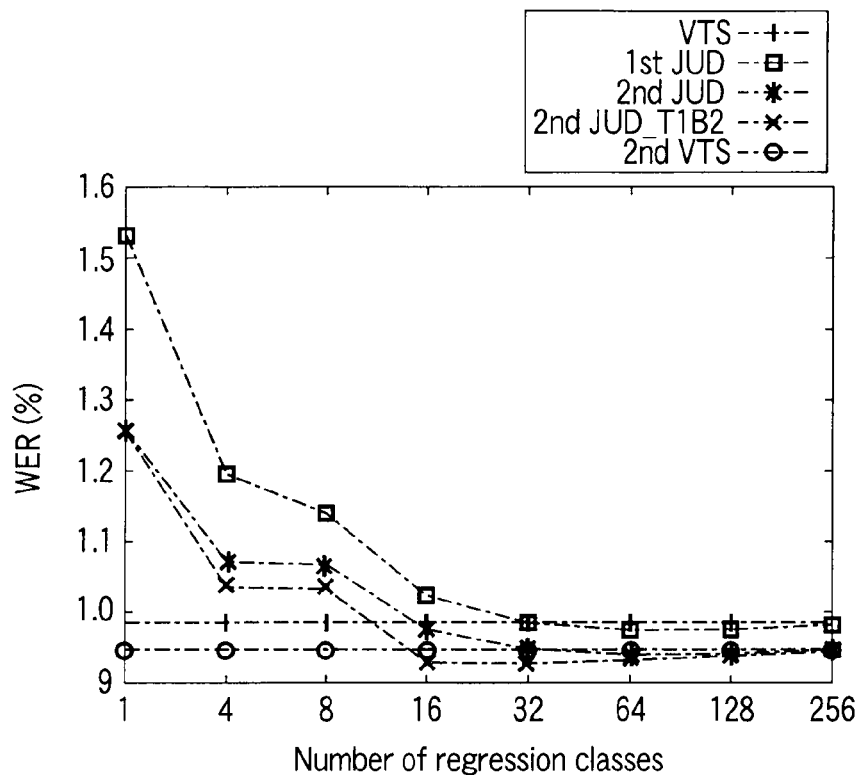
FIG. 7 is a plot of an error rate in a speech recognition system against number of aggression classes for the present invention and the prior art methods.

FIG. 7 is a plot of the word error rate (WER) against number of regression classes used. The result is shown for the prior art methods of VTS, second order VTS ($2^{nd}$ VTS). It should be noted that both of these traces are constant regardless of the number of regression classes simply because they do not use regression classes. The data also shows first order JUD ($1^{st}$ JUD) results. Finally, results from two implementations of the present embodiment are shown, $2^{nd}$ JUD where both the first order an second order coefficients are calculated for each regression class and $2^{nd}$ JUD-TIE2 where first order coefficients are calculated for each regression class and $2^{nd}$ order coefficients are only calculated for 2 regressions classes (i.e. level (ii) of FIG. 6).

The data was collection using the Aurora 2 database of connected digits. The database is divided into two training sets (clean and multi-condition) and three noisy testing sets. Test sets A and B respectively include four types of additive noise with SNR ranging from 20 to 0 decibels where set C also contains convolutional noise. In the experiment, the clean training set was used to train the model and test sets A and B were used for the regression test.

Regression was performed using a HMM from the HTK: Hidden Markov Model Toolkit 2 version 1.5 1993 S. Young. Each digit was modelled by 16 HMM states with three mixtures and silence was modelled by three states each with six mixtures. This left 546 mixtures in all. The front end was a 13 dimensional MFCC including the zeroth coefficient with their delta and delta-delta components. The regression process is implemented in a two-class mode similar to that used by Li et al "High performance HMM adaptation with joint compensation of additive and convolutive distortions via a vector Taylor series" Proc. of ASRU December 2007.

In the experiment the initial noise parameters $\mu_n$, $\Sigma_n$ and $\mu_h$ as well as a delta and delta-delta terms were estimated from the first and last 20 frames in each utterance.

The first order VTS was then applied to adapt the HMM in order to generate an initial recognition hypothesis.

An expectation-maximization based VTS noise estimation process was adopted to refine the noise parameters based on the initial hypothesis.

There refined noise parameters were then used in the above methods to compensate the HMM and obtain the final recognition results.

As the number of regression classes increases, it is clear that the performance of JUD with first order approximation becomes closer and closer to that of first order VTS. However, by applying the second order Taylor extension, JUD either in its simplified form or not improves performance consistently. The performance becomes significantly better than first-order VTS when the number of regression classes is larger than 16.

It is interesting to note that the simplified version achieves better performance than the non-simplified version on the Aurora 2. The more detailed results are shown in Table 1 below which indicates that the simplified second order JUD even with 32 regression classes brings 6.1% relative improvement on WER for set A and 5.6% for set B in VTS. Such an improvement is consistent across all noise types.

Figure 8:
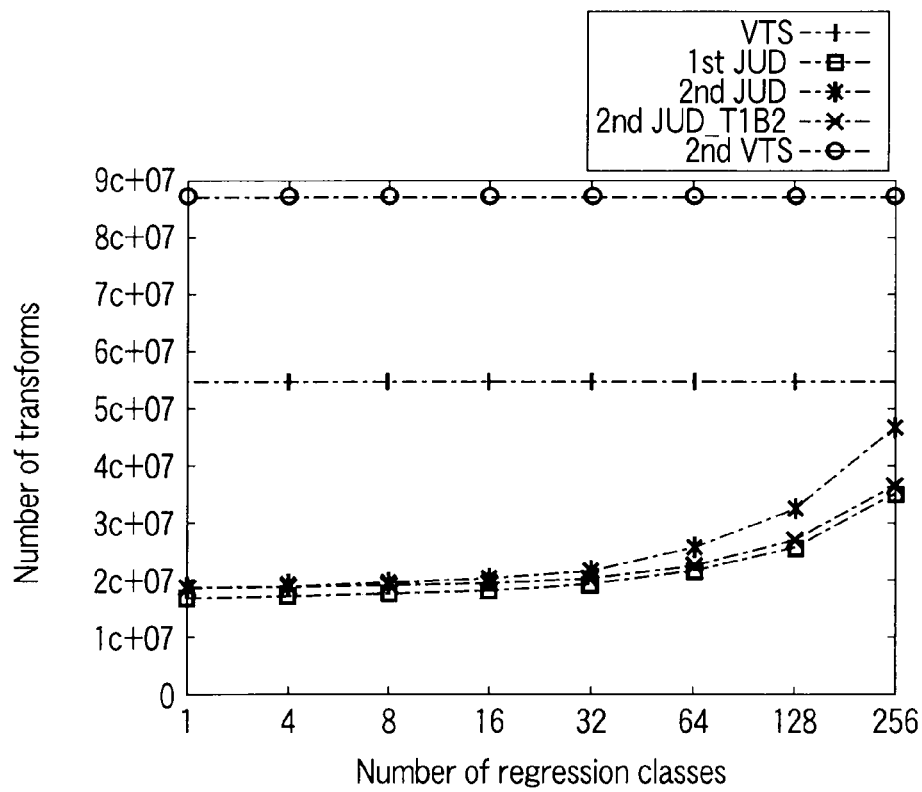
FIG. 8 is a plot of the number of transforms involved against number of aggressions classes for the method of the present invention and the prior art.

The computational cost is quantified as "number of instructions" against number of regression classes is shown in FIG. 8. The JUD based methods have a limited number of transforms compared to VTS and therefore far less computational costs. Compared to the original JUD, the second order approximation in JUD does introduce extra computational costs, but it is still much faster than first order and second VTS. Such an extra computational cost could be largely reduced by using the simplified second order approximation. Given the 6% WER improvement with 32 regression classes on set A, JUD with simplified second order approximation is about 60% faster than the first order VTS.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech recognition method, comprising:
receiving a speech input signal in a first noise environment which comprises a sequence of observations;
determining the likelihood of a sequence of words arising from the sequence of observations using an acoustic model, comprising,
    providing an acoustic model for performing speech recognition on a input signal which comprises a sequence of observations, wherein said model has been trained to recognise speech in a second noise environment, said model having a plurality of model parameters relating to the probability distribution of a word or part thereof being related to an observation, and

TABLE 1

|  |  | Set A | | | | | Set B | | | | |
|---|---|---|---|---|---|---|---|---|---|---|---|
| #Reg Class | Method | Subway | Babble | Car | Exhibition | Ave. | Restaurant | Street | Airport | Station | Ave. |
| — | Baseline | 35.92 | 52.34 | 46.60 | 40.30 | 43.79 | 49.27 | 41.21 | 47.86 | 47.97 | 46.58 |
| — | VTS | 10.76 | 11.68 | 7.39 | 9.48 | 9.83 | 10.79 | 9.82 | 7.60 | 8.03 | 9.06 |
| — | $2^{nd}$ VTS | 10.22 | 10.98 | 7.25 | 9.29 | 9.44 | 10.14 | 9.44 | 7.29 | 7.70 | 8.64 |
| 8 | $1^{st}$ JUD | 12.28 | 13.28 | 9.04 | 10.99 | 11.38 | 11.70 | 11.42 | 8.68 | 9.26 | 10.27 |
|  | $2^{nd}$ JUD | 11.51 | 11.28 | 8.44 | 11.38 | 10.65 | 10.57 | 10.58 | 7.76 | 8.47 | 9.35 |
|  | $2^{nd}$ JUD-TIE2 | 10.59 | 10.90 | 8.76 | 11.14 | 10.35 | 10.08 | 10.42 | 7.64 | 8.41 | 9.14 |
| 16 | $1^{st}$ JUD | 11.02 | 11.73 | 7.85 | 10.16 | 10.19 | 10.99 | 10.31 | 7.64 | 8.29 | 9.31 |
|  | $2^{nd}$ JUD | 10.47 | 10.77 | 7.67 | 10.10 | 9.75 | 10.19 | 9.86 | 7.31 | 7.86 | 8.81 |
|  | $2^{nd}$ JUD-TIE2 | 9.74 | 10.48 | 7.42 | 9.48 | 9.28 | 9.85 | 9.49 | 7.09 | 7.56 | 8.50 |
| 32 | $1^{st}$ JUD | 10.82 | 11.47 | 7.43 | 9.38 | 9.78 | 10.76 | 9.90 | 7.53 | 8.04 | 9.06 |
|  | $2^{nd}$ JUD | 10.24 | 10.68 | 7.41 | 9.44 | 9.44 | 9.97 | 9.63 | 7.17 | 7.70 | 8.62 |
|  | $2^{nd}$ JUD-TIE2 | 9.86 | 10.61 | 7.36 | 9.11 | 9.23 | 9.93 | 9.48 | 7.11 | 7.69 | 8.55 |

Table 2 shows the number of transformations i.e. K and W matrices involved in each method.

TABLE 2

| #Reg | VTS | $2^{nd}$ VTS | $1^{st}$ JUD | $2^{nd}$ JUD | $2^{nd}$ JUD-TIE2 |
|---|---|---|---|---|---|
| 8 | 546/546 | 1092/546 | 8/8 | 16/8 | 10/8 |
| 16 | 546/546 | 1092/546 | 16/16 | 32/16 | 18/16 |
| 32 | 546/546 | 1092/546 | 32/32 | 64/32 | 34/32 | adapting the model trained in the second environment to that of the first environment;
the speech recognition method further comprising,
determining the likelihood of a sequence of observations occurring in a given language using a language model; and
combining the likelihoods determined by the acoustic model and the language model and outputting a sequence of words identified from said speech input signal,
wherein adapting the model trained in the second environment to that of the first environment comprises using second order or higher order Taylor expansion coefficients derived for a group of probability distributions and wherein the same expansion coefficient is used for the whole group;

the speech recognition method further comprising estimating noise parameters used to determine the Taylor expansion coefficients, wherein the noise parameters comprise a component for additive noise and a component for convolutional noise, and an observation in the first noise environment is related to an observation in the second noise environment by:

$$y=x+h+g(x, n, h)=x+h+C\ln(1+e^{C^{-1}(n-x-h)}) \quad (1)$$

where y is the observation in the first noise environment, x is the observation in the second noise environment, n is the additive noise, h is the convolutional noise in the first environment with respect to the second environment and C is the discrete cosine transformation matrix.

2. A speech recognition method according to claim 1, wherein the groups are regression classes formed by regression during the initial training of the model.

3. A speech recognition method according to claim 1, wherein the groups are further combined to form aggregated groups and $j^{th}$ order Taylor coefficients are calculated and used for said groups and $j+1^{th}$ order coefficients are calculated and used for said aggregated groups.

4. A speech recognition method according to claim 1, wherein the model parameters comprise the static mean and static variance.

5. A speech recognition method according to claim 4, wherein the model parameters also comprise delta and delta-delta parts of the mean and variance, and where the second order or higher order terms are not calculated for the delta-delta part.

6. A speech recognition method according to claim 1, further comprising:

obtaining an initial estimate of the noise parameters from parts of the speech input signal where speech is not present.

7. A speech recognition method according to claim 1, wherein the probability distributions are Gaussians.

8. A speech recognition method according to claim 1, wherein the acoustic model is a hidden Markov Model.

9. A speech recognition method according to claim 1, wherein the first environment is a noisy environment and the second environment is a noise free environment.

10. A speech translation method, comprising:

receiving a speech input signal in a first noise environment which comprises a sequence of observations;

determining the likelihood of a sequence of words arising from the sequence of observations using an acoustic model, comprising, providing an acoustic model for performing speech recognition on a input signal which comprises a sequence of observations, wherein said model has been trained to recognise speech in a second noise environment, said model having a plurality of model parameters relating to the probability distribution of a word or part thereof being related to an observation, and adapting the model trained in the second environment to that of the first environment;

the speech translation method further comprising, determining the likelihood of a sequence of observations occurring in a given language using a language model;

combining the likelihoods determined by the acoustic model and the language model and outputting a recognized speech that includes a sequence of words identified from said speech input signal, wherein adapting the model trained in the second environment to that of the first environment comprises using second order or higher order Taylor expansion coefficients derived for a group of probability distributions and wherein the same expansion coefficient is used for the whole group;

translating said recognised speech into a different language;

outputting said recognised speech in said different language, and estimating noise parameters used to determine the Taylor expansion coefficients, wherein the noise parameters comprise a component for additive noise and a component for convolutional noise, and an observation in the first noise environment is related to an observation in the second noise environment by:

$$y=x+h+g(x, n, h)=x+h+C\ln(1+e^{C^{-1}(n-x-h)}) \quad (1)$$

where y is the observation in the first noise environment, x is the observation in the second noise environment, n is the additive noise, h is the convolutional noise in the first environment with respect to the second environment and C is the discrete cosine transformation matrix.

11. A speech translation method according to claim 10, wherein outputting said recognised speech comprises using a text to speech conversion method.

12. A method of adapting a speech recognition model between first and second noise environments, the method comprising:

providing a model for performing speech recognition on a input signal which comprises a sequence of observations, wherein said model has been trained to recognise speech in a second noise environment, said model having a plurality of model parameters relating to the probability distribution of a word or part thereof being related to an observation;

adapting the model trained in the second environment to that of the first environment;

wherein adapting the model trained in the second environment to that of the first environment comprises using second order or higher order Taylor expansion coefficients derived for a group of probability distributions and wherein the same expansion coefficient is used for the whole group; and estimating noise parameters used to determine the Taylor expansion coefficients, wherein the noise parameters comprise a component for additive noise and a component for convolutional noise, and an observation in the first noise environment is related to an observation in the second noise environment by:

$$y=x+h+g(x, n, h)=x+h+C\ln(1+e^{C^{-1}(n-x-h)}) \quad (1)$$

where y is the observation in the first noise environment, x is the observation in the second noise environment, n is the additive noise, h is the convolutional noise in the first environment with respect to the second environment and C is the discrete cosine transformation matrix.

13. A method of adapting a pattern recognition model between first and second noise environments, the method comprising:

providing a model for performing pattern recognition on a input signal which comprises a sequence of observations, wherein said model has been trained to recognise a pattern in a second noise environment, said model having a plurality of model parameters relating to the probability distribution of a component of a pattern being related to an observation;

adapting the model trained in the second environment to that of the first environment, wherein adapting the model trained in the second environment to that of the first environment comprises using second order or higher order Taylor expansion coefficients derived for a group of probability distributions and wherein the same expansion coefficient is used for the whole group; and estimating noise parameters used to determine the Taylor expansion coefficients, wherein the noise parameters comprise a component for additive noise and a component for convolutional noise, and an observation in the first noise environment is related to an observation in the second noise environment by:

$$y = x + h + g(x, n, h) = x + h + C \ln(1 + e^{C^{-1}(n-x-h)}) \quad (1)$$

where y is the observation in the first noise environment, x is the observation in the second noise environment, n is the additive noise, h is the convolutional noise in the first environment with respect to the second environment and C is the discrete cosine transformation matrix.

14. A method implemented by a computer programmed as a speech recognition apparatus, the method comprising:

receiving a speech input signal in a first noise environment which comprises a sequence of observations;

determining the likelihood of a sequence of words arising from the sequence of observations using an acoustic model, comprising:

providing an acoustic model for performing speech recognition on a input signal which comprises a sequence of observations, wherein said model has been trained to recognise speech in a second noise environment, said model having a plurality of model parameters relating to the probability distribution of a word or part thereof being related to an observation;

adapting the model trained in the second environment to that of the first environment;

the method further comprising, determining the likelihood of a sequence of observations occurring in a given language using a language model;

combining the likelihoods determined by the acoustic model and the language model and outputting a sequence of words identified from said speech input signal, wherein adapting the model trained in the second environment to that of the first environment comprises using second order or higher order Taylor expansion coefficients derived for a group of probability distributions and wherein the same expansion coefficient is used for the whole group; and estimating noise parameters used to determine the Taylor expansion coefficients, wherein the noise parameters comprise a component for additive noise and a component for convolutional noise, and an observation in the first noise environment is related to an observation in the second noise environment by:

$$y = x + h + g(x, n, h) = x + h + C \ln(1 + e^{C^{-1}(n-x-h)}) \quad (1)$$

where y is the observation in the first noise environment, x is the observation in the second noise environment, n is the additive noise, h is the convolutional noise in the first environment with respect to the second environment and C is the discrete cosine transformation matrix.

15. A speech recognition apparatus, said apparatus comprising:

a receiver for a speech input signal, said speech input signal comprising a sequence of observations, a processor adapted to determine the likelihood of a sequence of words arising from the sequence of observations using an acoustic model, said processor being configured to:

provide an acoustic model for performing speech recognition on said input signal, wherein said model has been trained to recognise speech in a second noise environment which is different to the first noise environment of said speech input signal, said model having a plurality of model parameters relating to the probability distribution of a word or part thereof being related to an observation; and adapt the model trained in the second environment to that of the first environment, determine the likelihood of a sequence of observations occurring in a given language using a language model; and combine the likelihoods determined by the acoustic model and the language model;

the apparatus further comprising an output adapted for outputting a sequence of words identified from said speech input signal, wherein adapting the model trained in the second environment to that of the first environment comprises using second order or higher order Taylor expansion coefficients derived for a group of probability distributions and wherein the same expansion coefficient is used for the whole group; and said processor further configured to estimate noise parameters used to determine the Taylor expansion coefficients, wherein the noise parameters comprise a component for additive noise and a component for convolutional noise, and an observation in the first noise environment is related to an observation in the second noise environment by:

$$y = x + h + g(x, n, h) = x + h + C \ln(1 + e^{C^{-1}(n-x-h)}) \quad (1)$$

where y is the observation in the first noise environment, x is the observation in the second noise environment, n is the additive noise, h is the convolutional noise in the first environment with respect to the second environment and C is the discrete cosine transformation matrix.

16. A speech recognition apparatus according to claim 15, further adapted to combine the groups further to form aggregated groups and $j^{th}$ order Taylor coefficients are calculated and used for groups and $j+1^{th}$ order coefficients are calculated and used for said aggregated groups.

17. An apparatus according to claim 15, wherein the output comprises a display, printer or electronic signal readable by a further apparatus.

* * * * *